United States Patent
Filsinger et al.

(10) Patent No.: US 10,794,845 B2
(45) Date of Patent: Oct. 6, 2020

(54) SET-UP AND METHOD FOR SPATIALLY RESOLVED MEASUREMENT WITH A WAVELENGTH-DISPERSIVE X-RAY SPECTROMETER

(71) Applicant: Bruker AXS GmbH, Karlsruhe (DE)

(72) Inventors: Frank Filsinger, Karlsruhe (DE); Uwe Metka, Bruchsal (DE)

(*) Notice: Subject to any disclaimer, the term of this patent is extended or adjusted under 35 U.S.C. 154(b) by 0 days.

(21) Appl. No.: 16/216,384

(22) Filed: Dec. 11, 2018

(65) Prior Publication Data
US 2019/0187076 A1    Jun. 20, 2019

(30) Foreign Application Priority Data
Dec. 19, 2017    (DE) .................. 102017223228.5

(51) Int. Cl.
*G01N 23/20091*    (2018.01)
*G21K 1/02*    (2006.01)
(Continued)

(52) U.S. Cl.
CPC ... *G01N 23/20091* (2013.01); *G01N 23/2076* (2013.01); *G01N 23/223* (2013.01);
(Continued)

(58) Field of Classification Search
CPC .. G01N 23/2009; G01N 23/20; G01N 23/223; G01J 3/36; G01J 3/02; G01J 3/1809
See application file for complete search history.

(56) References Cited

U.S. PATENT DOCUMENTS

| 3,833,810 A | 9/1974 | Efanov et al. |
|---|---|---|
| 5,008,910 A | 4/1991 | Van Egeraat |

(Continued)

FOREIGN PATENT DOCUMENTS

| DE | 1090877 B | 10/1960 |
|---|---|---|
| DE | 60312489 T2 | 1/2008 |

(Continued)

OTHER PUBLICATIONS

Tsuji, Kouichi et al., "New developments of X-ray fluorescence imaging techniques in laboratory", Spectrochimica Acta Part B 113 (2015) p. 43-53.

(Continued)

*Primary Examiner* — Yara B Green
(74) *Attorney, Agent, or Firm* — Benoit & Côté Inc.

(57) ABSTRACT

X-ray spectrometer comprising an X-ray source emitting X-ray radiation onto a sample, a collimator arrangement for collimating X-ray radiation that has passed through a diaphragm arrangement, the collimator arrangement comprising a modified Soller slit with mutually parallel lamellae forming a plurality of slit-shaped passages, at least a portion of the slit-shaped passages having partition walls aligned substantially perpendicularly to the slit-shaped passages, the partition walls being non-transmissive to X-ray radiation and restricting the transverse divergence of the X-ray radiation passing through the collimator arrangement in a direction transversely with respect to the diffraction plane of the X-ray radiation coming from the sample. Significantly faster spatially resolved measurements can thus be carried out.

21 Claims, 5 Drawing Sheets

(51) Int. Cl.
*G01N 23/207* (2018.01)
*G01N 23/223* (2006.01)

(52) U.S. Cl.
CPC ......... *G21K 1/02* (2013.01); *G01N 2223/076* (2013.01); *G01N 2223/316* (2013.01); *G01N 2223/3301* (2013.01); *G01N 2223/3306* (2013.01); *G01N 2223/40* (2013.01); *G21K 1/025* (2013.01)

(56) References Cited

U.S. PATENT DOCUMENTS

| | | | |
|---|---|---|---|
| 5,408,512 A * | 4/1995 | Kuwabara | G01N 23/2076 378/148 |
| 6,850,593 B1 * | 2/2005 | Tamura | G01N 23/223 378/49 |
| 7,085,349 B2 | 8/2006 | Vigliante | |
| 7,149,279 B2 | 12/2006 | Kumakhov et al. | |
| 7,983,389 B2 | 7/2011 | Ollinger et al. | |
| 8,536,552 B2 | 9/2013 | Freund et al. | |
| 9,064,611 B2 | 6/2015 | Freund et al. | |
| 2002/0172322 A1 * | 11/2002 | Kawahara | G01N 23/223 378/45 |
| 2004/0174959 A1 | 3/2004 | Green | |
| 2006/0083350 A1 * | 4/2006 | Gerndt | G01N 23/20 378/70 |
| 2010/0254516 A1 | 10/2010 | Harding | |
| 2012/0326059 A1 | 12/2012 | Hawman et al. | |

FOREIGN PATENT DOCUMENTS

| | | |
|---|---|---|
| DE | 602004012031 T2 | 3/2009 |
| DE | 102008060070 B4 | 10/2010 |
| DE | 102010062133 A1 | 5/2012 |
| DE | 102010062192 B3 | 6/2012 |
| EP | 0623817 B1 | 11/1994 |
| EP | 3246696 A1 | 11/2017 |
| JP | S50-006874 | 2/1975 |
| JP | S50-147983 A | 11/1975 |
| JP | S53-034585 | 3/1978 |
| JP | S63-229351 A | 9/1988 |
| JP | H06308060 A | 11/1994 |
| JP | 2001027620 A | 1/2001 |
| JP | 2007-017350 A | 1/2007 |
| JP | 2009-085668 A | 4/2009 |
| JP | 2013-088265 A | 5/2013 |

OTHER PUBLICATIONS

Ohmori, Takashi et al., "Wavelength dispersive X-ray fluorescence imaging using high-sensitivity imaging sensor", Spectrochimica Acta Part B (2013) p. 56-60.

* cited by examiner

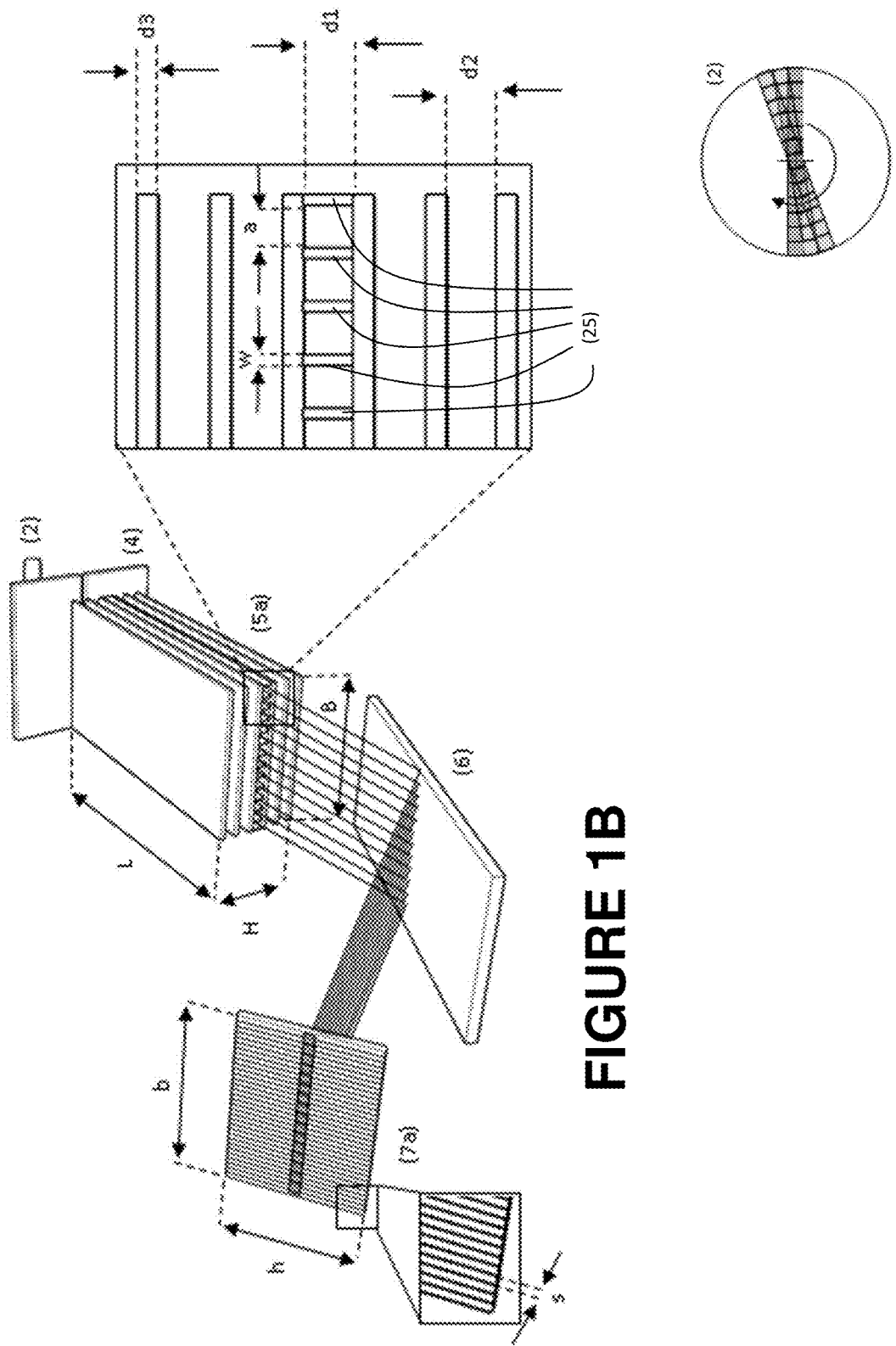

SET-UP AND METHOD FOR SPATIALLY RESOLVED MEASUREMENT WITH A WAVELENGTH-DISPERSIVE X-RAY SPECTROMETER

BACKGROUND OF THE INVENTION

Field of the Invention

The present invention relates generally to the field of X-ray spectrometry, and here in particular to X-ray fluorescence spectrometry.

Description of the Related Art

The invention relates to an X-ray spectrometer comprising an X-ray source emitting X-ray radiation onto a sample, the sample having a surface on which the X-ray radiation impinges, a diaphragm arrangement for shaping X-ray radiation that is diffracted or scattered at the surface of the sample or emitted by the sample, a collimator arrangement for collimating X-ray radiation that has passed through the diaphragm arrangement, an analyzer arrangement, at which part of the X-ray radiation that has passed through the collimator arrangement is reflected according to the Bragg condition, and a detector arrangement for receiving and detecting X-ray radiation reflected at the analyzer arrangement containing at least one detector that is spatially resolving in one dimension, the collimator arrangement comprising mutually parallel lamellae forming a plurality of slit-shaped passages Such an arrangement is known from EP 0 623 817 B1.

The elementary composition of a sample can be measured by a wavelength-dispersive X-ray spectrometer. In general, the composition averaged over the entire sample is determined in wavelength-dispersive X-ray spectrometers. For specific applications, however, the spatial distribution of the individual elements in the sample is also relevant. Since the measurement averaged over the samples allows shorter measurement times, a spectrometer can ideally switch back and forth between a measurement mode with spatial resolution and a measurement mode for determining the averaged composition.

In the prior art there are two conventional solution approaches for this purpose. The first approach is presented in EP 0 623 817 B1 (see, in particular, FIG. 1 therein). Here the conventional beam path of a wavelength-dispersive X-ray spectrometer (FIG. 1 on the left) is extended by a small movable diaphragm between the sample and a primary Soller slit. Said diaphragm restricts the field of view of the detector (which itself does not have spatial resolution), with the result that only X-ray radiation from a small region of the sample (e.g. a circle having a diameter of 1 mm) is detected. By displacing the diaphragm parallel to the lamellae of the primary Soller slit, the sample is scanned along a line through its center. In order to spatially measure the complete sample, the sample is subsequently rotated further step by step about its center until the entire sample surface has been measured. For measuring without spatial resolution, a large diaphragm is used, which allows radiation from the entire sample surface to be incident on the detector. The disadvantage of this approach is the very long measurement duration for the measurement with spatial resolution, since the diaphragm has to be displaced step by step and the sample is measured point by point here.

The use of conventional Soller arrangements in X-ray spectrometry is described for instance in DE 1 090 877 B and DE 10 2008 060 070 B4; U.S. Pat. No. 7,983,389 B2.

The second approach is presented in Ohmori et al., Spectrochimica Acta Part B, 83-84 (2013), 56-60 and Tsuji et al., Spectrochimica Acta Part B, 113 (2015), 43-53. Here straight polycapillaries are used instead of the Soller slits from the first approach outlined above. Said polycapillaries restrict the divergence of the X-ray radiation emitted by the sample both in the diffraction plane (as in the case of the conventional Soller slit) and perpendicularly thereto. Consequently, the location at which the X-ray radiation impinges on the detector is correlated with the location of the X-ray emission on the sample. If a detector having a two-dimensional spatial resolution is then used instead of a non-spatially resolving detector, such as is used in the first approach, then a two-dimensional image of the sample surface can be generated.

The following disadvantages arise in the case of this second approach. Polycapillaries as optical waveguides are based on the principle of total internal reflection at the inner walls of the capillaries. The critical angle of total internal reflection, which determines the spatial resolution of the approach, is inversely proportional to the energy of the X-ray radiation (see Ohmori et al.). Therefore, the spatial resolution is different for each element to be measured in a given sample, as is also illustrated in FIG. 4 of Ohmori et al. However, an element-independent spatial resolution would be desirable.

It is true that with the set-up it is also possible to measure the intensity integrated over the entire sample by summation over all pixels of the 2D detector. However, the efficiency is very much lower in comparison with an instrument having conventional Soller slits. The angular acceptance of the polycapillaries perpendicular to the diffraction plane is very much smaller than that of a Soller slit (typically more than one order of magnitude), which leads to a very much longer measurement time. Moreover, polycapillaries are relatively expensive.

SUMMARY OF THE INVENTION

The present invention is based on providing, with simple technical measures and without relatively high cost expenditure, an X-ray spectrometer of the type defined in the introduction which can be used to carry out significantly faster spatially resolved measurements in comparison with the prior art. This is achieved in a manner just as surprisingly simple as it is effective, by virtue of the fact that the diaphragm arrangement comprises a slit-shaped diaphragm; that the collimator arrangement comprises a modified Soller slit, in which the lamellae form a plurality of slit-shaped passages, but in which case, at least for a portion of the slits formed by the lamellae, partition walls aligned substantially perpendicularly to the slits are present, which partition walls are non-transmissive to X-ray radiation and restrict the transverse divergence of the X-ray radiation passing through the collimator arrangement in a direction transversely with respect to the diffraction plane of the X-ray radiation coming from the sample; and that the detector arrangement contains at least one detector that is spatially resolving in one dimension.

The invention thus proposes an improved X-ray analysis apparatus in which use is made of a modified form of a Soller slit having the features described above. The alignment of the elongate slit of the slit-shaped diaphragm is parallel to the slits formed by the lamellae. The detector used can be one having a one-dimensional spatial resolution.

An important aspect of the beam path downstream of the sample is as follows. A slit-shaped diaphragm, a modified Soller slit and a detector having 1D spatial resolution, together with a rotation of the sample, enable an efficient measurement of the spatial distribution of the elements in the sample. The slit-shaped diaphragm blocks part of the X-ray radiation emitted by the sample, such that only X-ray radiation from a narrow strip on the sample surface can enter the modified Soller slit. In this case, the center of said strip lies exactly at the center of the sample. Partition walls are present between the two central lamellae of the Soller slit where the X-ray radiation enters, which partition walls restrict the transverse divergence of the radiation (perpendicularly to the diffraction plane). A defined location on the sample is thus imaged onto a defined location on the detector.

For detecting the radiation, preferably a detector is used which has a spatial resolution in (at least) one spatial direction (here specifically a strip detector). The strips of the detector are arranged perpendicular to the lamellae of the Soller diaphragm. Thereby, the complete visible strip on the sample can be measured simultaneously in a spatially resolved manner. If the sample is rotated further, the entire sample can be measured step by step. To switch to the "normal measurement mode", the slit diaphragm is removed and the intensity is integrated over all strips of the detector.

The following advantages are achieved by comparison with the two approaches from the prior art described above:
In comparison with the first approach, the measurement time for scanning a rotatable round sample is shortened by a factor corresponding to the ratio of half the sample diameter to the desired maximum step size (at the edge of the sample). Given a typical sample radius of 15 mm and a spatial resolution of 1 mm, this results e.g. in a factor of 15.
In comparison with the second approach, the spatial resolution is independent of the energy of the X-ray radiation since the modified Soller slit is not based on total internal reflection, rather the radiation to be suppressed is simply absorbed.
In comparison with the second approach, it is possible to switch with significantly higher efficiency to the normal measurement mode, in which only the intensity integrated over the sample is relevant. By simply removing the slit diaphragm—which will be described in detail further below—almost the same efficiency as for the measurement with a conventional Soller slit is achieved, since the transverse divergence is restricted only between the central two lamellae of the Soller slit. However, a typical Soller slit consists of 40 to 100 lamellae, and so only intensity losses of 1 to 2% should be expected.

In an exemplary embodiment of the X-ray spectrometer according to the invention, the sample is mounted in the X-ray spectrometer rotatably about an axis perpendicular to the surface of said sample. This enables the fast, spatially resolved measurement of the element composition of the sample. By means of stepwise rotation of the sample and measurement of the X-ray radiation emanating from the sample, the entire surface of the sample can be captured.

Further advantageous embodiments are characterized by the fact that the detector of the detector arrangement that is spatially resolving at least in one dimension is embodied as a strip detector, and that the strips of the at least one strip detector are aligned perpendicularly to the slit-shaped passages of the modified Soller slit. This is the optimum alignment of the detector, enabling the best spatial resolution.

A further advantageous embodiment provides for the diaphragm arrangement to be mechanically incorporated in the X-ray spectrometer in such a way that the diaphragm arrangement is positionable upstream or downstream of the collimator arrangement for a spatially resolved scanning measurement of the sample and is removable from the beam path of the X-ray spectrometer for an integrating measurement. Thereby one apparatus may enable both a fast averaged element analysis of the entire sample and the spatially resolved element analysis. The diaphragm arrangement can also be made such that it is completely removable or fixedly insertable.

One particular embodiment is characterized by the fact that in the modified Soller slit of the collimator arrangement partition walls are present only between the slit-shaped passage which is formed by two adjacent lamellae and which is located opposite the slit of the diaphragm arrangement. The performance when carrying out measurements for the averaged element analysis (i.e. upon switching to the mode without spatial resolution) is thus least affected since only a few partition walls attenuate the X-ray radiation transmitted by the collimator arrangement.

One class of particularly advantageous embodiments of the inventive X-ray spectrometer is distinguished by the fact that in the modified Soller slit of the collimator arrangement partition walls are present only in the two slit-shaped passages of the three central adjacent lamellae, wherein the central one of said three lamellae is located opposite the center of the slit of the diaphragm arrangement. This arrangement increases the achievable resolution in the spatially resolved measurements since even in the central part of the sample the field of view of the detector changes during a rotation of the sample.

Alternatively, in another class of advantageous embodiments, in the modified Soller slit of the collimator arrangement partition walls are present between all the slit-shaped passages formed by adjacent lamellae. A spatially resolved measurement of the entire surface of the sample is thus made possible. In particular, a detector that is spatially resolving in two dimensions is advantageous here.

A further advantageous embodiment of the inventive X-ray spectrometer is distinguished by the fact that the detector arrangement contains a segmented strip detector that is spatially resolving in one dimension, or two strip detectors that are arranged one directly above the other and are each spatially resolving in one dimension. This arrangement considerably increases the speed of the spatially resolved measurement in comparison with a detector having continuous strips.

An embodiment is also advantageous in which the slit-shaped diaphragm of the diaphragm arrangement is mounted movably in steps or continuously perpendicularly to the local beam path and perpendicularly to its slit direction. In this embodiment, the spatially resolved measurement is achieved by means of a suitable displacement of the diaphragm arrangement. Moreover, the step size during scanning, i.e. the spatial resolution during the measurement, is identical for all points on the sample since the diaphragm arrangement moves on by one slit of the modified Soller slit with each measurement step.

Particular advantages are also provided by embodiments of the invention in which the sample is circular in the plane of its surface and in the beam path of the X-ray spectrometer between the sample and the slit-shaped diaphragm of the diaphragm arrangement or between the slit-shaped diaphragm of the diaphragm arrangement and the modified Soller slit of the collimator arrangement there is positioned a fixed further diaphragm, in particular having an elliptical diaphragm passage, which restricts the field of view of the detector arrangement such that only the sample itself is imaged. This reduces the background signal from the sample holder, which possibly likewise reflects X-ray light emanating from the X-ray source or is excited by the X-ray source and itself emits X-ray fluorescence radiation.

Further embodiments of the X-ray spectrometer according to the invention are distinguished by the fact that the distances between the lamellae are chosen such that the divergence of the X-ray beam downstream of the collimator arrangement in the diffraction direction in the central section of the modified Soller slit is the same as in the rest of the collimator arrangement. This ensures that the spectral resolution does not change upon the switching from the measurement with spatial resolution to the integrating mode.

Major technical benefit is also achieved by a class of embodiments in which at least one portion of the partition walls of the modified Soller slit of the collimator arrangement is constructed in segmented fashion in the direction of the local beam path. Material savings are thus made possible. Moreover, the production of the modified Soller slit can also be made simpler as a result, for instance through the use of 3D printing methods.

Certain aspects of these embodiments are distinguished by the fact that the individual segments of the partition walls in each case have a length x and a distance z from the directly adjacent segments, and that the ratio x/z is chosen such that no line of sight exists through the respective slit-shaped passage between respectively adjacent tubes formed by the partition walls. This ensures that the spatial resolution is not adversely affected by the segmentation.

In a further class of advantageous embodiments, the lamellae and the partition walls of the modified Soller slit are produced by means of 3D printing of the central section of the collimator arrangement, in particular from tungsten-containing material. This production method enables a relatively free shaping. Tungsten (or some other element having a high atomic number) is advantageous in order that the X-ray radiation is absorbed by the partition walls as effectively as possible.

Additional advantages are achieved by developments of these embodiments which are characterized by the fact that the cross sections of the tubes formed by respectively adjacent partition walls and lamellae are chosen such that a symmetrical spot becomes visible in the projection onto the surface of the sample, in particular that the cross sections are chosen to be elliptical and the spot becomes circular. This facilitates the evaluation of the measured spatially resolved images.

The size of the detector should preferably be adapted to the beam path. In particular, the sensitive area of the at least one strip detector of the detector arrangement that is spatially resolving in one dimension should be chosen to be of at least the same magnitude as the entire opened cross-sectional area of the modified Soller slit of the collimator arrangement, wherein in particular h≥H and b≥B hold true, where:
h=height of the sensitive area of the strip detector,
b=width of the sensitive area of the strip detector,
H=height of the cross-sectional area of the modified Soller slit,
B=width of the cross-sectional area of the modified Soller slit.

Furthermore, the beam path should be chosen such that the entire sample can be imaged. In particular, the cross section of the modified Soller slit of the collimator arrangement should be chosen in terms of shape and size such that X-ray radiation from the entire surface of the sample can be captured.

Moreover, the spatial resolution of the detector should not be coarser than the desired spatial resolution on the sample. Therefore, it is advantageous if the strip width s of the strips of the at least one strip detector is smaller than the desired spatial resolution on the sample.

A modified Soller slit alone in which partition walls are present between a portion of the slit-shaped passages also falls within the scope of the present invention, as does a modified Soller slit alone in which at least one portion of the partition walls is constructed in segmented fashion in the direction of the local beam path.

Further advantages of the invention are evident from the description and the drawing figures. Likewise, the features mentioned above and those that will be explained further can be used according to the invention in each case individually by themselves or as a plurality in arbitrary combinations. The embodiments shown and described should not be understood as an exhaustive enumeration, but rather have exemplary character for outlining the invention.

BRIEF DESCRIPTION OF THE DRAWINGS

The invention is illustrated in the drawings and is explained in greater detail on the basis of exemplary embodiments. In the drawings:

FIG. 1B is a top perspective view of the embodiment of FIG. 1A from the direction of the detector arrangement, which is shown partially enlarged in a detailed illustration on the left. The figure also shows the modified Soller slit perpendicular to the slit-shaped passages in an enlarged schematic sectional illustration on the right.

FIG. 1C is a schematic illustration indicating rotation of the sample from FIG. 1A with a sample region captured through the slit-shaped diaphragm.

DETAILED DESCRIPTION

Figure 1A:
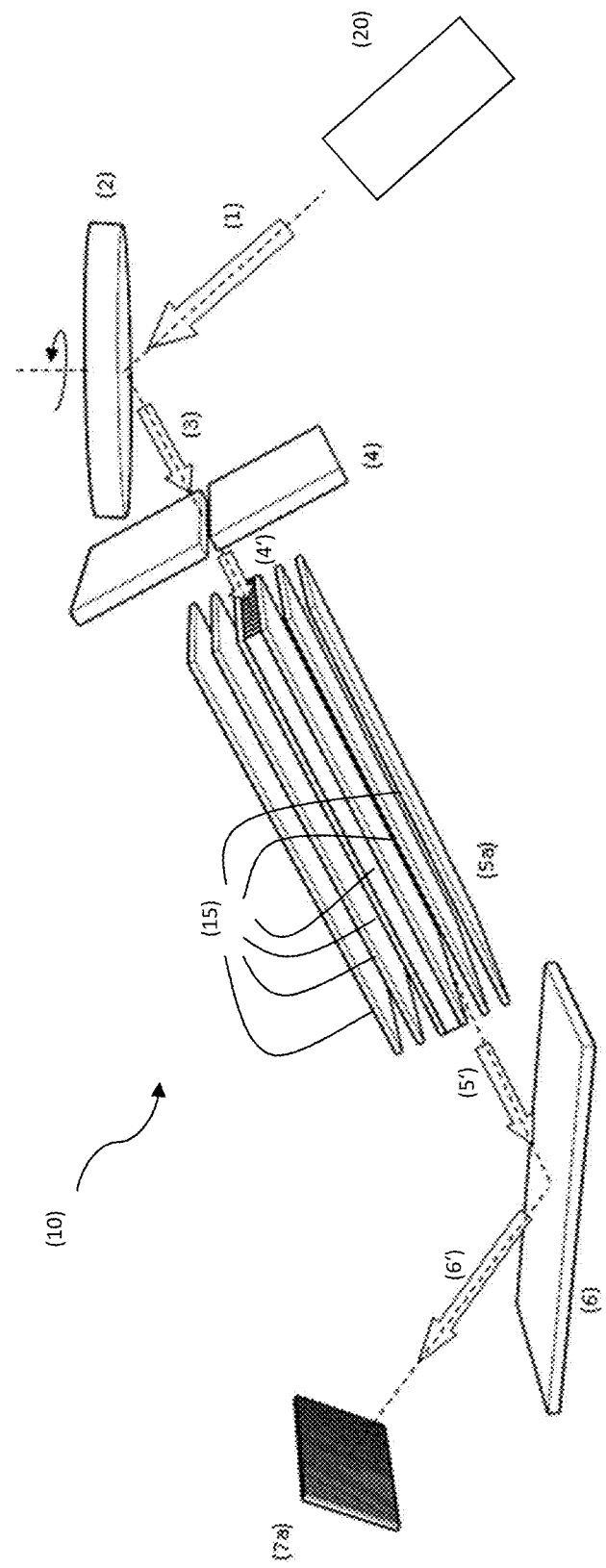
FIG. 1A shows a schematic side perspective view of a first embodiment of the invention with partition walls in only one slit-shaped passage of the modified Soller slit.

The present invention proceeds from an X-ray spectrometer 10 comprising an X-ray source 20, from which X-ray radiation 1 is passed onto a sample 2 to be examined and having a surface on which the X-ray radiation 1 from the X-ray source 20 impinges, comprising a diaphragm arrangement 4, through which X-ray radiation 3 diffracted or scattered at the surface of the sample 2 or emitted by the sample 2 can pass, comprising a collimator arrangement 5a; 5b; 5c; 5d; 5e having a plurality of mutually parallel lamellae 15 for X-ray radiation 4' that has passed through the diaphragm arrangement 4, comprising an analyzer arrangement 6, at which part of the X-ray radiation 5' that has passed through the collimator arrangement 5a; 5b; 5c; 5d; 5e is reflected whilst complying with the Bragg condition, and comprising a detector arrangement 7a; 7b for receiving and detecting X-ray radiation 6' reflected at the analyzer arrangement 6.

This arrangement is characterized according to the invention by the fact that the diaphragm arrangement 4 comprises a slit-shaped diaphragm; that the collimator arrangement 5a; 5b; 5c; 5d; 5e comprises a modified Soller slit, in which the lamellae 15 form a plurality of slit-shaped passages, but in which case, at least for a portion of the slits formed by the lamellae 15, partition walls 25 (FIG. 1 B) aligned substantially perpendicularly to the slits are present, which partition walls are non-transmissive to X-ray radiation and restrict the transverse divergence of the X-ray radiation 5' passing through the collimator arrangement 5a; 5b; 5c; 5d; 5e in a direction transversely with respect to the diffraction plane of the X-ray radiation 3 coming from the sample 2; and that the detector arrangement 7a; 7b contains at least one detector that is spatially resolving in one dimension. Preferably, said detector is configured as a strip detector.

Important to the implementation of the invention is the combination of a slit-shaped diaphragm, a modified Soller slit and a detector in the beam path, wherein the detector is spatially resolving in at least one spatial dimension, and in some embodiments the use of rotation of the sample.

The embodiments of the invention that are illustrated schematically in FIGS. 1A-3B show in detail three particularly preferred variants of the X-ray spectrometer according to the invention. As shown in FIG. 1A, the radiation 1 emitted by the X-ray tube 20 strikes the sample 2. The X-ray radiation 3 enters through a slit diaphragm 4 into a collimator arrangement 5a having a modified Soller slit and is reflected, whilst complying with the Bragg condition, at the analyzer crystal of the analyzer arrangement 6 onto a detector 7a that is spatially resolving in at least one dimension. FIG. 1B shows that the modified Soller slit restricts the divergence both in the diffraction plane (like a normal Soller slit) and perpendicular thereto. This enables the spatially resolved imaging of the strip on the sample that is visible through the slit diaphragm onto the detector. As shown in FIG. 1C, by means of a stepwise rotation of the sample, the entire sample can be measured in a spatially resolved manner.

Variant 1: Beam Path as Shown in FIGS. 1A-1B

The arrangement together with a spatially resolving detector allows a significantly faster spatially resolved measurement. (Advantage vis à vis EP 0 623 817 B1). Only one component has to be motorized for the scanning, generally by rotation of the sample. The diaphragm remains stationary during the scanning of the sample. (Advantage vis à vis EP 0 623 817). The spatial resolution is independent of the energy of the X-ray radiation, i.e. of the element to be measured. (Advantage vis à vis Ohmori et al. and Tsuji et al., cited above)

The set-up allows the efficient switching between spatially resolved measurement and integrating measurement. For this purpose, it is merely necessary to remove the slit-shaped diaphragm from the beam path, which generally can be done without problems even manually (e.g. through the opening for sample supply). (Advantage vis à vis Ohmori et al. and Tsuji et al.). The modified Soller slit is simpler and more cost-effective to produce than polycapillaries, e.g. by 3D printing of the central part made from tungsten. (Advantage vis à vis Ohmori et al. and Tsuji et al.). A 1D detector is less complex than a 2D detector and thus generally also more cost-effective. (Advantage vis à vis Ohmori et al. and Tsuji et al.).

Advantageous or Typical Implementation Features of the Set-Up

The sensitive area of the detector should be (at least) of the same magnitude as the cross section of the modified Soller diaphragm, that is to say h≥H and b≥B (For dimensional indications cf. FIG. 1B). The cross section of the Soller slit is generally chosen such that X-ray radiation from the entire surface of the sample can be captured. The strip width s of the detector, i.e. the spatial resolution thereof, should be smaller than the desired spatial resolution on the sample.

Typical dimensions in a wavelength-dispersive X-ray spectrometer

Length of the modified Soller slit along the beam axis L=50-150 mm

Figures 2A, 2B:
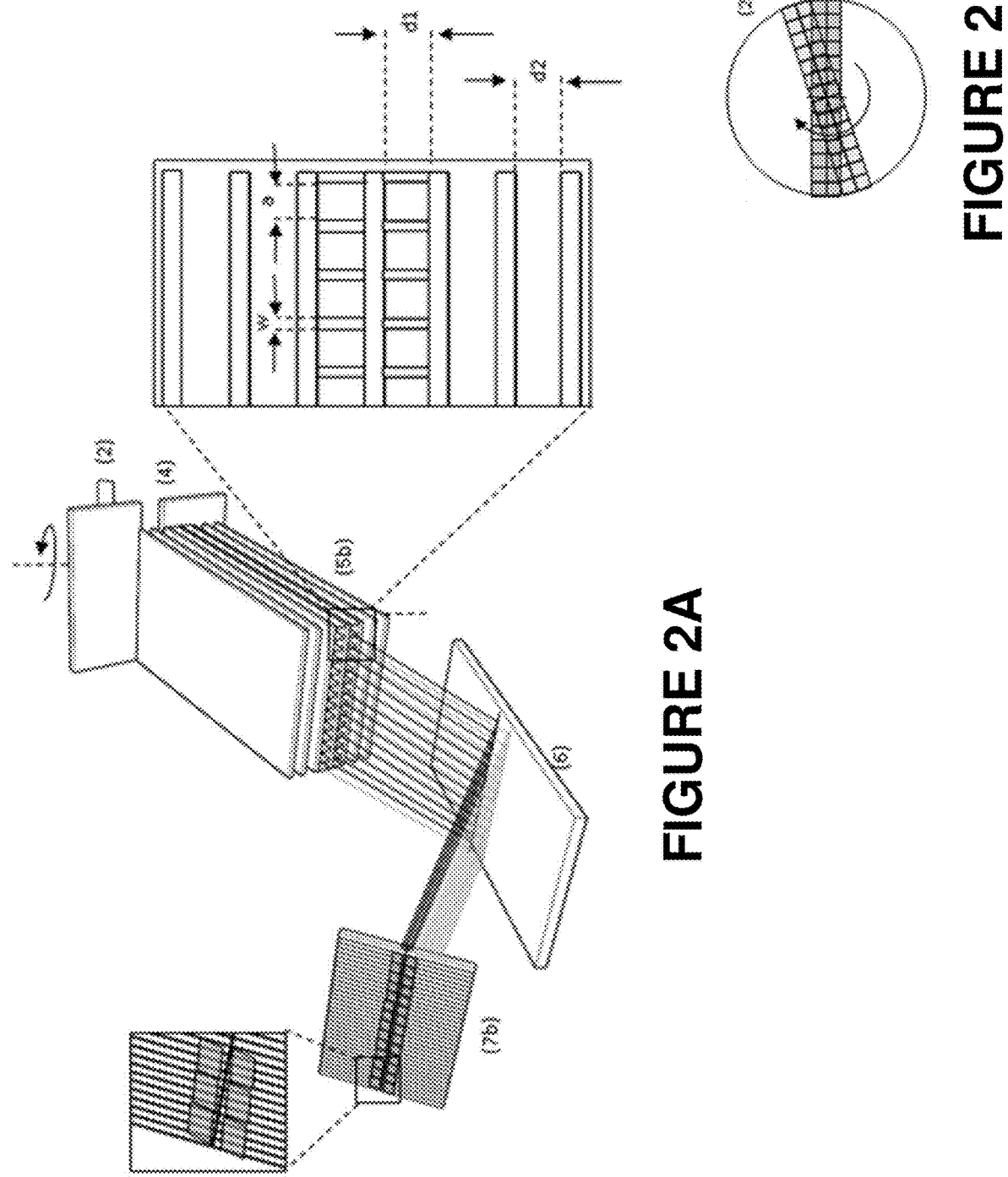
FIG. 2A shows a schematic illustration of a second embodiment obliquely from above from the direction of the detector arrangement, with partition walls only in two adjacent slit-shaped passages of the modified Soller slit and with a detector arrangement having two segments separated from one another, the detector arrangement being shown partially enlarged in the detail illustration on the left, and the modified Soller slit perpendicular to the slit-shaped passages shown with an enlarged schematic sectional illustration on the right.
FIG. 2B shows schematically an indicated rotation of the sample of FIG. 2A with a sample region captured through the slit-shaped diaphragm.

Height of the modified Soller slit perpendicular to the beam axis, perpendicular to the Soller slits H≈20 mm Width of the modified Soller slit perpendicular to the beam axis, parallel to the Soller slits B≈30 mm Distance between the lamellae of the modified Soller slit in the edge region d2=0.1-2 mm Thickness of the lamellae in the edge region d3=0.1 mm Strip width of the detector s=0.05-0.15 mm Thickness of the partition walls in the modified Soller slit w=0.1-0.2 mm Distance between the partition walls in the modified Soller slit a=0.5-1 mm Distance between the lamellae in the central region of the modified Soller slit, in which central region partition walls are present: d1=0.5-1 mm Height of the detector h≈20 mm Width of the detector b≈30 mm In the example shown in FIG. 2A, the X-ray radiation emitted by the sample 2 enters through a slit-shaped diaphragm 4 into a modified Soller slit of the collimator arrangement 5b and is reflected, whilst complying with the Bragg condition, at the analyzer crystal of the analyzer arrangement 6 onto a spatially resolving detector 7b. In contrast to variant 1, the detector consists of two segments and, in the modified Soller slit, partition walls for restricting the transverse divergence are fitted between the central three lamellae. The upper series of "tubes" images a strip of the sample onto the lower segment of the detector; the lower series of tubes simultaneously images a strip of the sample onto the upper segment of the detector. As shown in FIG. 2B, by means of a stepwise rotation of the sample, the entire sample can be measured in a spatially resolved manner.

Variant 2: Beam Path as Shown in FIG. 2A

Here use is made of a segmented 1D detector (or two 1D detectors arranged one directly above another) and a modified Soller slit having partition walls between the central three lamellae, thus giving rise to two series of "tubes" lying one above another. The upper series of tubes is imaged onto one half of the segmented detector; the lower series of tubes onto the other half of the segmented detector. The center of the sample lies exactly between the central four "tubes".

Advantages of variant 2 vis à vis variant 1:
The speed for scanning the sample is twice as high.
Even in the central part of the sample, the field of view of the detector changes with the rotation of the sample. Additional information is thus obtained through step sizes which are smaller than the effective spatial resolution of the set-up.

Figure 3B:
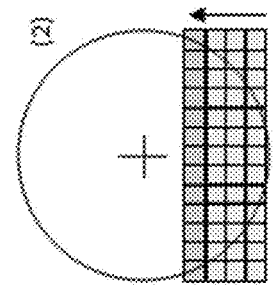
FIG. 3B shows a sample from FIG. 3A with schematically indicated scanning by the displacement of the slit-shaped diaphragm in the direction of the arrow.
Figure 3A:
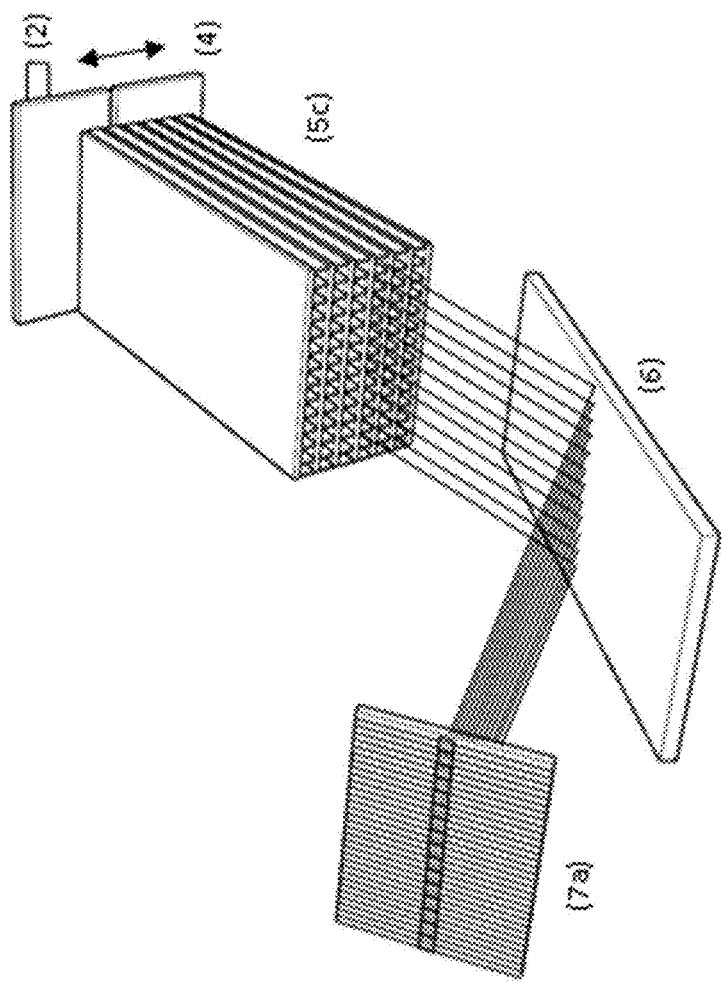
FIG. 3A shows a schematic illustration of a third embodiment obliquely from above from the direction of the detector arrangement, including a displaceable slit diaphragm, partition walls in all slits of the modified Soller slit and with a detector arrangement as in FIGS. 1A-1B.

In the example shown in FIGS. 3A-3B, the X-ray radiation diffracted, scattered or emitted by the sample 2 enters through a slit diaphragm into a modified Soller slit of the collimator arrangement 5c and is reflected, whilst complying with the Bragg condition, at the analyzer crystal of the analyzer arrangement 6 onto a spatially resolving detector 7a. In contrast to variants 1 and 2, partition walls for restricting the transverse divergence are present between all lamellae of the Soller diaphragm. The sample need not be rotated during the measurement. Instead the slit diaphragm is moved as illustrated in order to scan the complete sample. As shown in FIG. 3B, by means of a displacement of the slit-shaped diaphragm, the entire sample can be measured in a spatially resolved manner with the same step size.

Variant 3: Beam Path as Shown in FIG. 3A

Unlike in the embodiment according to FIGS. 1A-1C, walls that restrict the transverse divergence are present between all lamellae of the Soller slit. The sample does not rotate; instead the slit-shaped diaphragm is moved in order to scan the sample.

Advantages of variant 3 vis à vis variants 1 and 2:
A measurement faster by a factor of ~1.5 is made possible.
The step size is identical for all positions on the surface of the sample.
No point of the sample is scanned multiply.
Particularly advantageous embodiment of variant 3:
A fixed (e.g. elliptical) diaphragm is positioned between the slit-shaped diaphragm and the modified Soller slit and restricts the field of view of the detector such that only the sample itself is imaged. Advantage: the background signal from the sample holder is suppressed, primarily for pixels that intersect the edge of the sample.
Advantageous developments of variants 1 to 3:
All components, in particular including the detector, are situated in a vacuum.

Advantage: Even light elements can be measured. The 2D detectors in Refs. [2,3] are positioned behind a polymer window (see FIG. 2 therein) outside the vacuum chamber of the spectrometer. This hampers the measurement of light elements since the polymer window absorbs a significant part of the fluorescence radiation.

Figure 4A:
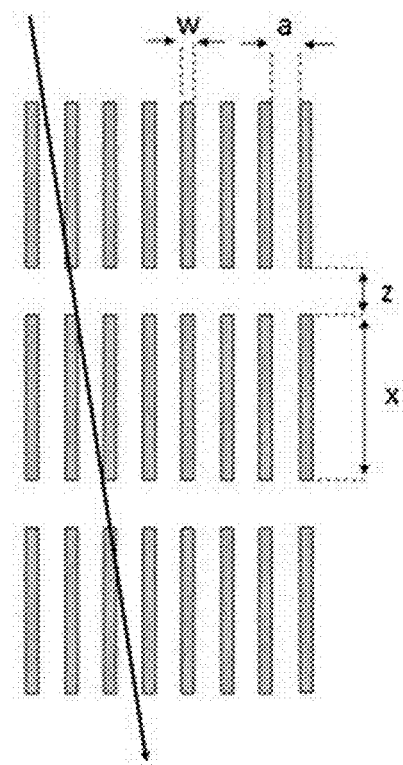
FIG. 4A shows a schematic horizontal section through a central slit plane of an embodiment in which partition walls of the modified Soller slit are segmented, the embodiment having three partition segments in the beam direction, whereby the line of sight indicated as an arrow is blocked.
Figure 4B:
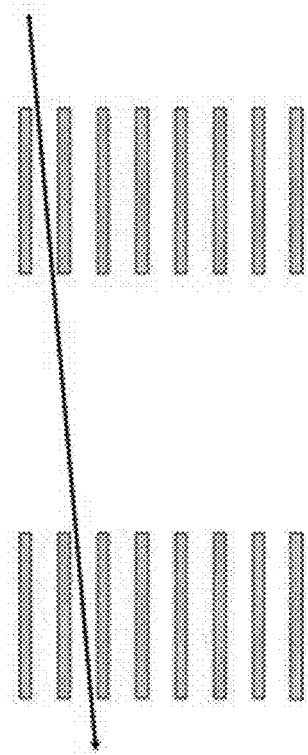
FIG. 4B shows a schematic horizontal section through a central slit plane of another embodiment in which partition walls of the modified Soller slit are segmented, the embodiment having two partition segments in the beam direction, whereby the line of sight indicated as an arrow is not blocked.

That part of the modified Soller slit which contains partition walls for restricting the transverse divergence (or the complete Soller slit) is composed of a plurality of segments that are at a distance z from one another along the beam direction (see FIGS. 4A and 4B). The distance z between the segments and the length x thereof are chosen such that no line of sight exists through the Soller slit between in each case two adjacent "tubes" (see FIG. 4A). The configuration in FIG. 4B would not function in practice since a photon that enters a tube can emerge through an adjacent tube. The correlation between the location of the emission on the sample and the location of the detection on the detector is lost here.

For all embodiments in accordance with FIGS. 1A-3B, it is furthermore advantageous not to rotate the sample but rather to translate it in a direction perpendicular to the field of view of the detector restricted by the diaphragm arrangement 4 on the sample. As a result, no point of the sample is scanned multiply.

Figure 4C:
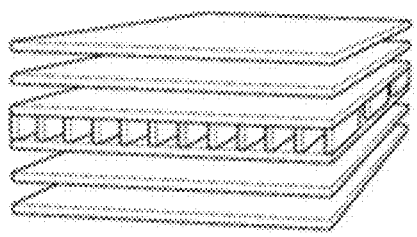
FIG. 4C is a schematic spatial illustration of the embodiment according to FIG. 4A.
Figure 4D:
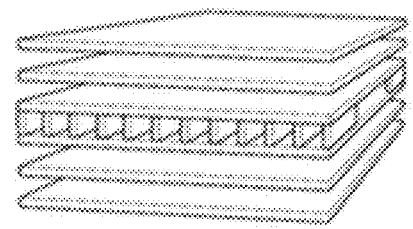
FIG. 4D is a schematic spatial illustration of the embodiment according to FIG. 4B.

FIGS. 4A and 4B show a horizontal section through the central part of the modified Soller slit. In the version of the invention as illustrated here, the partition walls are segmented. As set out above, the variant according to FIG. 4A would function, whereas the variant according to FIG. 4B would not. FIG. 4C shows the variant implemented in FIG. 4A for clarification in a 3D view. FIG. 4D shows the variant implemented in FIG. 4B in a 3D view. One advantage of this embodiment is the material saving with the use of 3D printing. A further advantage consists in simpler production during 3D printing. After printing, the powder subsequently has to be removed, which is all the simpler, the shorter the tubes.

The cross section of the tubes can be chosen (e.g. as elliptical) such that a symmetrical spot is visible (e.g. in circular fashion) in the projection onto the surface. The cross section of the tubes can also be chosen such that the divergence in the diffraction direction in the central part and in the remaining part of the Soller slit is identical, i.e. the dimensions d1 and d2 in FIGS. 1B and 2A are identical. An advantage provided is that the spectral line width is not altered upon switching between integrating mode and measurement with spatial resolution. It is furthermore advantageous if d1>d2 is chosen since more intensity from the surface of the sample can then be collected during spectrally resolving measurement with an introduced diaphragm arrangement 4.

LIST OF REFERENCE SIGNS

1 X-ray radiation from an X-ray source
2 Sample
3 X-ray radiation emitted by the sample
4 Diaphragm arrangement
4' X-ray radiation that has passed through the diaphragm arrangement
5a; 5b; 5c; 5d; 5e Collimator arrangement
5' X-ray radiation that has passed through the collimator arrangement
6 Analyzer arrangement
6' X-ray radiation reflected at the analyzer arrangement
7a; 7b Detector arrangement 10 X-ray spectrometer
15 Lamellae
20 X-ray source
25 Partition walls

The invention claimed is:

1. An X-ray spectrometer comprising:
    an X-ray source emitting X-ray radiation onto a sample, the sample having a surface on which the X-ray radiation impinges,
    a slit-shaped diaphragm arrangement for shaping X-ray radiation that is diffracted or scattered at the surface of the sample or emitted by the sample,
    a collimator arrangement for collimating X-ray radiation that has passed through the diaphragm arrangement,
    an analyzer arrangement, at which part of the X-ray radiation that has passed through the collimator arrangement is reflected according to the Bragg condition, and
    a detector arrangement for receiving and detecting X-ray radiation reflected at the analyzer arrangement containing at least one detector that is spatially resolving in one dimension,
    wherein the collimator arrangement comprises a modified Soller slit with mutually parallel lamellae forming a plurality of slit-shaped passages, and at least a portion of the slit-shaped passages have partition walls aligned substantially perpendicularly to the slit-shaped passages, the partition walls being non-transmissive to X-ray radiation and restricting the transverse divergence of the X-ray radiation passing through the collimator arrangement in a direction transversely with respect to the diffraction plane of the X-ray radiation coming from the sample.

2. An X-ray spectrometer according to claim 1, wherein the sample is mounted in the X-ray spectrometer rotatably about an axis perpendicular to the surface of said sample.

3. An X-ray spectrometer according to claim 1, wherein the detector of the detector arrangement is a strip detector, and wherein the strips of the strip detector are aligned perpendicularly to the slit-shaped passages of the modified Soller slit.

4. An X-ray spectrometer according to claim 1, wherein the diaphragm arrangement is mechanically incorporated in the X-ray spectrometer in such a way that the diaphragm arrangement is positionable upstream or downstream of the collimator arrangement for a spatially resolved scanning measurement of the sample and is removable from the beam path of the X-ray spectrometer for an integrating measurement.

5. An X-ray spectrometer according to claim 1, wherein partition walls are present only in the slit-shaped passage which is located opposite to the slit of the diaphragm arrangement.

6. An X-ray spectrometer according to claim 1, wherein partition walls are present only in the two slit-shaped passages of the three central adjacent lamellae, wherein the central one of said three lamellae is located opposite to the center of the slit of the diaphragm arrangement.

7. An X-ray spectrometer according to claim 1, wherein partition walls are present between all slit-shaped passages.

8. An X-ray spectrometer according to claim 1, wherein the detector arrangement contains a segmented strip detector that is spatially resolving in one dimension, or two strip detectors that are arranged one directly above the other and are each spatially resolving in one dimension.

9. An X-ray spectrometer according to claim 1, wherein the slit-shaped diaphragm is mounted movably in steps or continuously perpendicularly to the local beam path and perpendicularly to its slit direction.

10. An X-ray spectrometer according to claim 1, wherein the sample is circular in the plane of its surface and the X-ray spectrometer comprises a further fixed diaphragm positioned in the beam path between the sample and the slit-shaped diaphragm or between the slit-shaped diaphragm and the modified Soller slit, the further fixed diaphragm having an elliptical diaphragm passage, which restricts the field of view of the detector arrangement such that only the sample itself is imaged.

11. An X-ray spectrometer according to claim 1, wherein the distances between the lamellae are chosen such that the divergence of the X-ray beam downstream of the collimator arrangement in the diffraction direction in the central section of the modified Soller slit is the same as in the rest of the collimator arrangement.

12. An X-ray spectrometer according to claim 1, wherein the lamellae and the partition walls of the central section of the collimator arrangement are produced by means of 3D printing.

13. An X-ray spectrometer according to claim 12, wherein the lamellae and the partition walls of the central section of the collimator arrangement are produced from tungsten-containing material.

14. An X-ray spectrometer according to claim 1, wherein the cross sections of the tubes formed by adjacent partition walls and lamellae are chosen such that a symmetrical spot becomes visible in the projection onto the surface of the sample.

15. An X-ray spectrometer according to claim 14, wherein the cross sections of the tubes are chosen to be elliptical and the spot becomes circular.

16. An X-ray spectrometer comprising:
    an X-ray source emitting X-ray radiation onto a sample, the sample having a surface on which the X-ray radiation impinges,
    a slit-shaped diaphragm arrangement for shaping X-ray radiation that is diffracted or scattered at the surface of the sample or emitted by the sample,
    a collimator arrangement for collimating X-ray radiation that has passed through the diaphragm arrangement,
    an analyzer arrangement, at which part of the X-ray radiation that has passed through the collimator arrangement is reflected according to the Bragg condition, and
    a detector arrangement for receiving and detecting X-ray radiation reflected at the analyzer arrangement containing at least one detector that is spatially resolving in one dimension,
    wherein the collimator arrangement comprises a modified Soller slit with mutually parallel lamellae that form a plurality of slit-shaped passages, and at least a portion of the slit-shaped passages have partition walls aligned substantially perpendicularly to the slit-shaped passages, the partition walls being non-transmissive to X-ray radiation and restricting the transverse divergence of the X-ray radiation passing through the collimator arrangement in a direction transversely with respect to the diffraction plane of the X-ray radiation coming from the sample, wherein at least one portion of the partition walls of the modified Soller slit is segmented in the direction of the local beam path.

17. An X-ray spectrometer according to claim 16, wherein the individual segments of the partition walls in each case have a length x and a distance z from the directly adjacent segments, and wherein the ratio x/z is chosen such that no line of sight exists through the respective slit-shaped passage between respectively adjacent tubes formed by the partition walls.

18. A Soller slit with mutually parallel lamellae forming a plurality of slit-shaped passages, at least a portion of the slit-shaped passages having partition walls aligned substantially perpendicularly to the slit-shaped passages, the partition walls being non-transmissive to X-ray radiation for restricting the divergence of the X-ray radiation passing through the Soller slit.

19. A Soller slit according to claim 18, wherein partition walls are present only in one slit-shaped passage.

20. A Soller slit according to claim 18, wherein partition walls are present only in two slit-shaped passages of the three central adjacent lamellae.

21. A Soller slit according to claim 18, wherein partition walls are present between all slit-shaped passages.

* * * * *